H. M. HUXLEY.
APPARATUS FOR COATING METALS.
APPLICATION FILED MAY 22, 1907.
928,385.
Patented July 20, 1909.
2 SHEETS—SHEET 1.
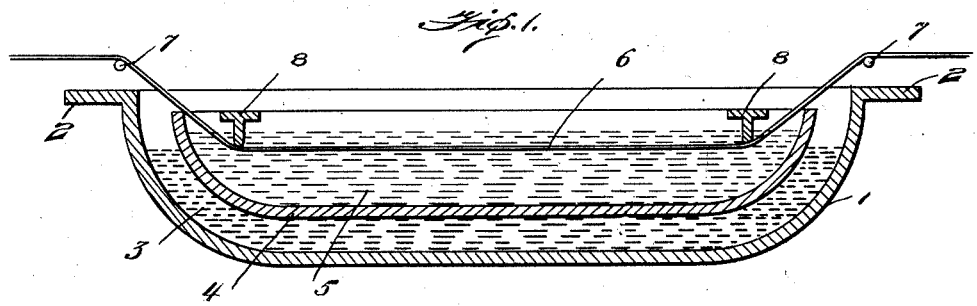
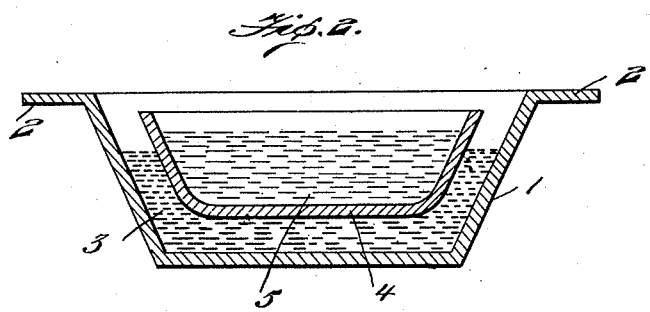
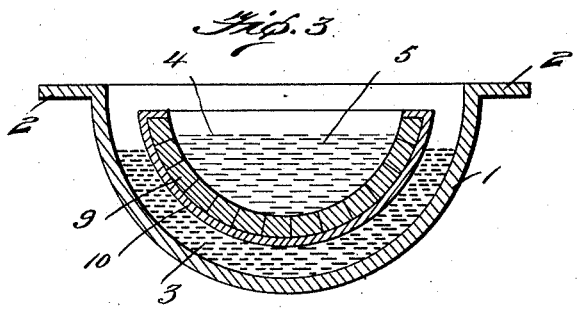
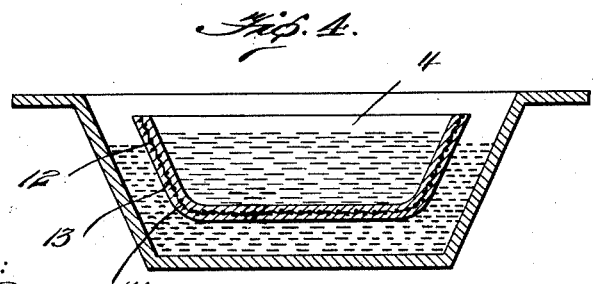
WITNESSES:
INVENTOR
H. M. Huxley.
BY Marble McElroy & Matty
Attorneys

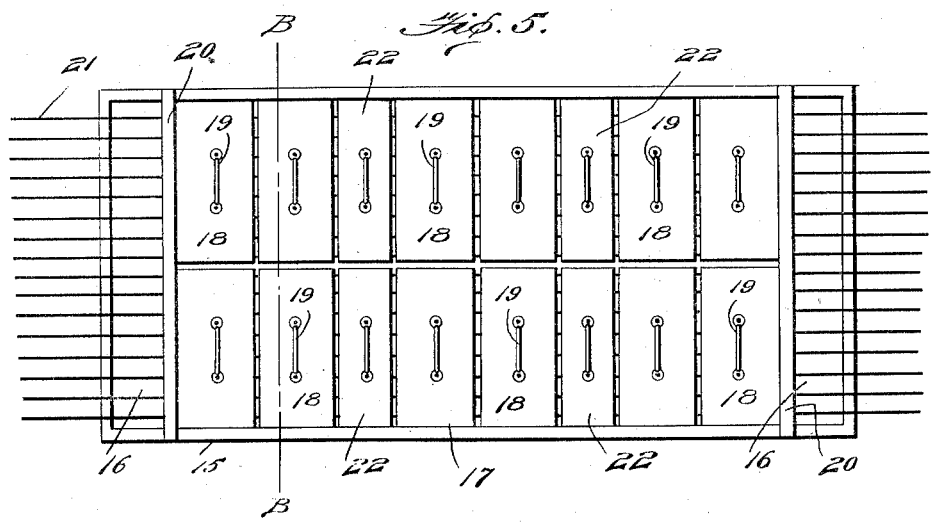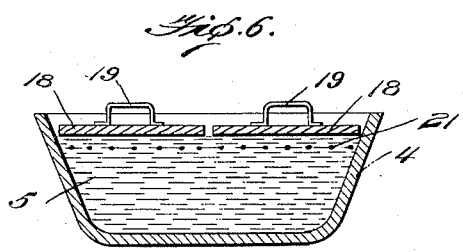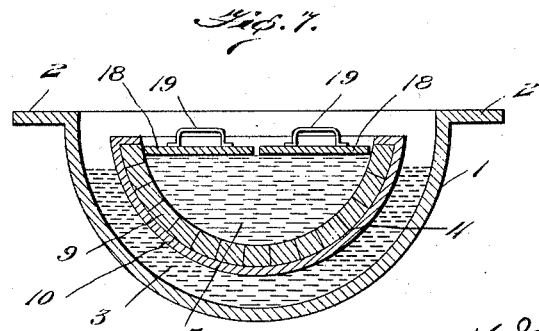

UNITED STATES PATENT OFFICE.

HENRY MINOR HUXLEY, OF WORCESTER, MASSACHUSETTS, ASSIGNOR TO AMERICAN STEEL AND WIRE COMPANY, OF WORCESTER, MASSACHUSETTS, A CORPORATION OF NEW JERSEY.

APPARATUS FOR COATING METALS.

No. 928,385.  Specification of Letters Patent.  Patented July 20, 1909.

Application filed May 22, 1907. Serial No. 375,117.

*To all whom it may concern:*

Be it known that I, HENRY MINOR HUXLEY, residing in Worcester, in the county of Worcester and State of Massachusetts, and a citizen of the United States, have invented certain new and useful Improvements in Apparatus for Coating Metals; and I hereby declare the following to be a full, clear, and exact description of the same, such as will enable others skilled in the art to which it appertains to make and use the same.

This invention relates to apparatus for coating metals and consists in apparatus for containing and maintaining baths of sensitive molten coating metals away from contaminating influences while such baths are employed for coating metal objects; all as more fully hereinafter set forth and as claimed.

In continuous processes of metal coating with fluid metals, as in tinning and galvanizing wire, sheets and the like, it is necessary to maintain large bodies of such metals in a molten condition for a long period of time and as these metals are quite sensitive to oxidation and to contamination by other metals, there is generally considerable loss of metal, and much inconvenience. This is especially true in the galvanizing art to which this invention more particularly relates. Melted zinc is highly oxidizable and it readily attacks the iron vessels which are generally used to contain it during the galvanizing operation, corroding and ultimately piercing them and itself becoming contaminated with "dross," which is an iron-zinc mixture. Vessels of most refractory materials are not suitable since they do not permit the free communication of heat which is necessary to keep the zinc molten. Graphite is eminently suitable for holding zinc and similar metals and does not contaminate them while its heat conductivity is good, but graphite vessels are not strong nor are they well suited for long exposure to fire heat as they burn out in time.

In the present invention the vessel for holding the fluid coating metal is made of heat-conductive refractory material, preferably graphite or plumbago, though carborundum and similar materials may be used, and this vessel is surrounded by or bathed in, a bath of a molten metal which does not attack iron, such as lead, the bath in turn being contained in an iron vessel heated in any suitable way, as by fire heat. Graphite does not contaminate zinc or tin, nor is it attacked by them. And used in this manner it is shielded from the direct action of fire heat so that it may have an indefinite life. Nor is it necessary that the graphite vessel should have great structural strength since the weight of the body of molten metal to be contained is counterbalanced by the buoyant action of the bath of melted lead outside, though, if desired, such structural strength may be imparted to it in a sufficient degree in the manner hereinafter set forth.

Coating vessels intended for continuous operation are usually of considerable length where heavy, relatively inflexible wire and sheets are to be treated since such materials obviously cannot well be bent at sharp angles and must attain the same temperature as that of the coating metal. In coating telegraph wire, for instance, it is customarily introduced at one end of a relatively long shallow vessel and withdrawn at the other. Between these two points the long surface of coating metal is exposed more or less to oxidation, and, since the level of the metal varies more or less, it is not very practicable to protect it by the use of a fixed cover as more or less air will gain entrance to the surface when the level of the metal is low. In order to protect the metal, powdered materials such as borax, coke, charcoal, etc., are frequently strewn on its surface, but these are not very effective as more or less air gains access between the particles. According to the present invention, I cover the surface of the molten metal between these points with a floating cover formed of one or several, but preferably several, plates of refractory material extending between the sides of the vessel but leaving its ends clear for introduction and withdrawal of the articles to be coated, suitable stopping means being provided to keep the floating cover in the midportion of the vessel and away from its ends. The plate or plates may be made of any suitable material unaffected by the molten metal in the coating bath and of lower specific gravity. For general use, graphite is suitable, but ordinary ceramic materials are also applicable. When the metal is lead, ordinary iron plates may be used.

In the accompanying illustration I have shown, more or less diagrammatically certain types of apparatus embodying my invention.

In this showing: Figure 1 is a longitudinal vertical section of a kettle or vessel for tinning, galvanizing and the like; Fig. 2 is a vertical section of the structure of Fig. 1 on section line A—A; Fig. 3 is a similar section of a modified form; Fig. 4 is a similar section of another modified form; Fig. 5 is a plan view of the inner vessel provided with a floating protective cover; Fig. 6 is a vertical transverse section of the same on line B—B, Fig. 5; and Fig. 7 is a similar view of a modified form.

In all views, heating means are not shown, it being understood that any suitable furnace or other type of heating apparatus customarily employed in the art may be used.

In Fig. 1, reference 1 designates an iron or steel jacket vessel provided with end flanges 2 to permit its assemblage with heating means. 3 designates a bath of lead or other fusible metal or alloy not attacking iron; 4 is the inner vessel of graphite or the like; 5 is a contained body of zinc or tin or like metal; 6 is a wire or sheet being coated; and 7 and 8 are respectively rollers and hold-down means for passing the article through the bath. The reference numerals in Fig. 2 designate similar elements.

In Fig. 3, the inner graphite vessel 4 is made sectional, being built of the sections 9, the joints being rendered tight by the use of a suitable clay or other cementing material. To give the vessel additional strength, it is provided with an iron or steel jacket, 10. This preferably has an overhanging flange 11 to keep the graphite lining in place. The lining may be made in one piece, as by molding it directly into the steel shell or jacket, but the use of bricks or slabs, as shown, is convenient.

In Fig. 4, the graphite vessel is reinforced and given greater structural strength by the use of reinforcing means, 12, contained within its body. The reinforcing means may be very conveniently, as shown, a simple steel mesh or wire gauze. 13 shows the horizontal wires of such a gauze in vertical section and 14 the vertical wires in elevation.

In Fig. 5 is shown a plan view of a vessel, which may be either the inner graphite vessel of the other figures, or an ordinary coating vessel, provided with the described floating cover. This vessel, designated as a whole by 15, has a clear space 16 at either end and an intermediate floating cover 17, built up, as shown, of a plurality of sections or plates, 18, each provided with a handle 19. The plates are kept in position, as shown, by cross-bars 20, though any other means, as, for instance, a slight taper of the ends of the vessel, might be adopted. 21 designates one of a plurality of wires being coated, feeding means being omitted for the sake of simplicity.

Fig. 6 shows a transverse section on line B—B of Fig. 5.

Fig. 7 shows the graphite inner vessel provided with the floating cover and contained in a bath of molten lead, etc., in a fire heated steel vessel.

The inner refractory vessel may simply float in the bath of molten metal contained in the outer or steel vessel, but it is ordinarily convenient to give it a fixed position by suitable holding means. This is particularly the case when the inner vessel is of comparatively large dimensions as in "kettles" intended for galvanizing heavy goods, such as fence wire, telegraph wire and the like, passed through continuously. With such large, long vessels the steel reinforcement, either as the casing shown in Fig. 3 or the contained steel gauze shown in Fig. 4, is desirable as giving additional strength to the graphite.

The presence of the large body of molten metal, such as lead, surrounding and bathing the coating vessel has a number of incidental advantages such as the maintenance of a substantially uniform temperature in the coating vessel, variations of temperature occurring slowly. As zinc or similar material has no action upon graphite, in galvanizing the excessive waste of metal by formation of "dross" does not occur, the only "dross" formed being the small amount made by the action of zinc on the articles introduced into the bath.

In galvanizing and tinning wire, the end of one coil of wire is often spliced to the beginning of the next in order to permit continuous operation. The molten metal is disturbed where the wire enters and leaves, but remains undisturbed between these two points and there is ordinarily no need of access to such metal therebetween. But in case the wire breaks, the sectional floating cover shown gives convenient access at the desired point, as a section may be removed by the handle shown.

In Fig. 5 plate 22 is shown somewhat narrower than the other plates to permit convenient removal.

The material which I employ for the inner vessel is far superior to fire-clay for the reason that it conducts the heat much more readily, and enables the zinc to be kept in a molten condition with much greater facility. Furthermore, the action of zinc and zinc oxid on fire clay is one of decomposition, and fire clay, if used for the purposes of my invention, would soon crumble and fall to pieces.

What I claim is:—

1. An apparatus for coating metals comprising an inner and an outer vessel spaced apart and adapted to contain a fluid metal in the space thus formed, said inner vessel comprising a layer of a good heat-conductive non-metallic material and said outer vessel being composed of a metal not attacked by said fluid metal.

2. An apparatus for coating metals comprising an inner and an outer vessel spaced apart and adapted to contain a fluid metal in the space thus formed, said inner vessel comprising a graphite layer and said outer vessel being composed of a metal not attacked by said fluid metal.

3. An apparatus for coating metals comprising an inner and an outer vessel spaced apart and adapted to contain a fluid metal in the space thus formed, said inner vessel comprising a reinforced graphite layer and said outer vessel being composed of a metal not attacked by said fluid metal.

4. An apparatus for coating metals comprising an inner and an outer vessel spaced apart and adapted to contain a fluid metal in the space thus formed, said inner vessel comprising a graphite layer held in a steel shell and said outer vessel being composed of a metal not attacked by said fluid metal.

5. An apparatus for coating metals comprising an inner and an outer vessel spaced apart and adapted to contain a fluid metal in the space thus formed, said inner vessel comprising a graphite layer formed in sections and held in a steel shell, and said outer vessel being composed of a metal not attacked by said fluid metal.

In testimony whereof, I affix my signature in the presence of two witnesses.

HENRY MINOR HUXLEY.

Witnesses:
 LULA E. HAMBURY,
 EDWARD A. BRODEUS.